United States Patent [19]

Handley

[11] Patent Number: 4,525,754
[45] Date of Patent: Jun. 25, 1985

[54] SYSTEM AND METHOD FOR SYNCHRONIZATION OF ROTARY HEAD MAGNETIC RECORDING/REPRODUCING DEVICES

[75] Inventor: Kirk H. Handley, Menlo Park, Calif.

[73] Assignee: Ampex Corporation, Redwood City, Calif.

[21] Appl. No.: 483,005

[22] Filed: Apr. 6, 1983

[51] Int. Cl.³ ............................................... G11B 5/09
[52] U.S. Cl. ..................................................... 360/51
[58] Field of Search ............................... 360/64, 51, 36

[56] References Cited
U.S. PATENT DOCUMENTS
4,425,646  1/1984  Kinoshira et al. ...................... 360/51

Primary Examiner—Vincent P. Canney
Attorney, Agent, or Firm—Elizabeth E. Strnad; Joel D. Talcott

[57] ABSTRACT

A timing error between consecutive tracks of reproduced data from a rotary scan recording/reproducing device is detected as a difference between a normal and actual occurrence of a synchronization signal. A correction signal is provided to reduce the timing error and it is stored, updated and utilized to offset a bit counter synchronous with the reproduced data in the absence of the synchronization signal. The effect of short term dynamic errors is reduced by accumulating occurrences of the timing error in the same direction and updating the stored correction signal only when a predetermined number of occurrences in one direction is obtained.

15 Claims, 14 Drawing Figures

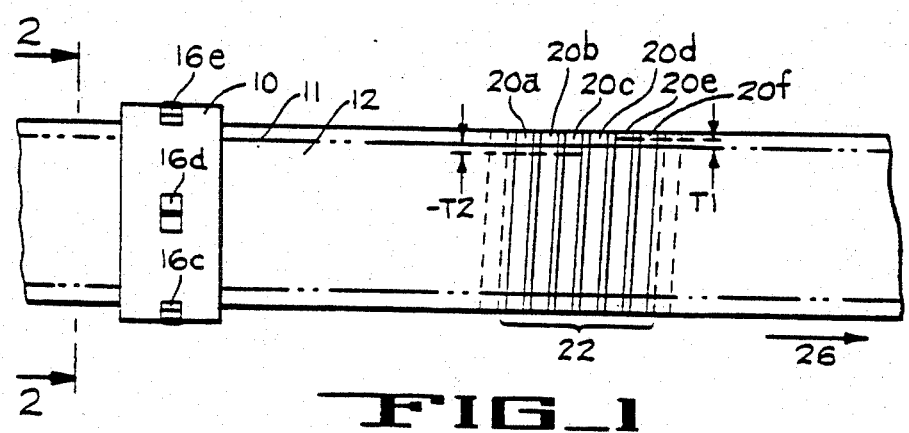
FIG_1
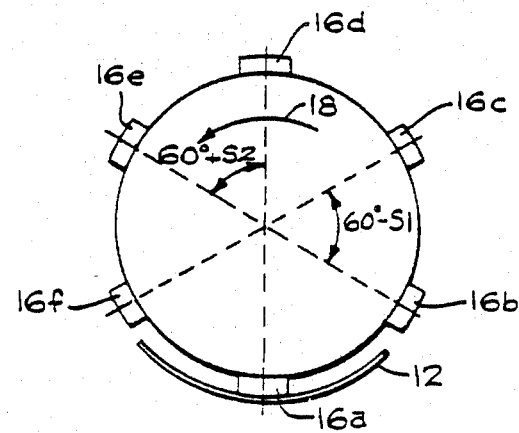
FIG_2

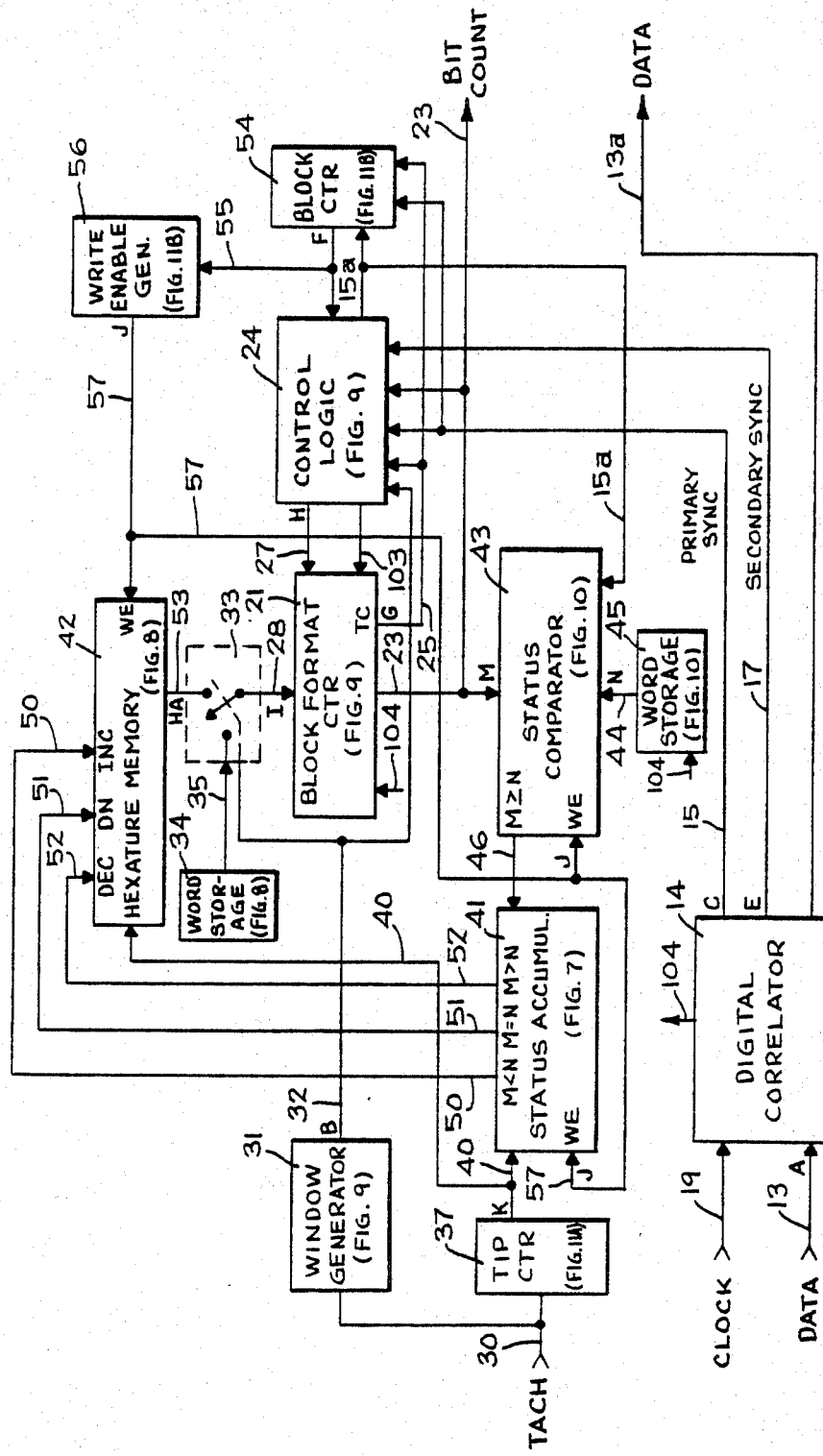
FIG_3

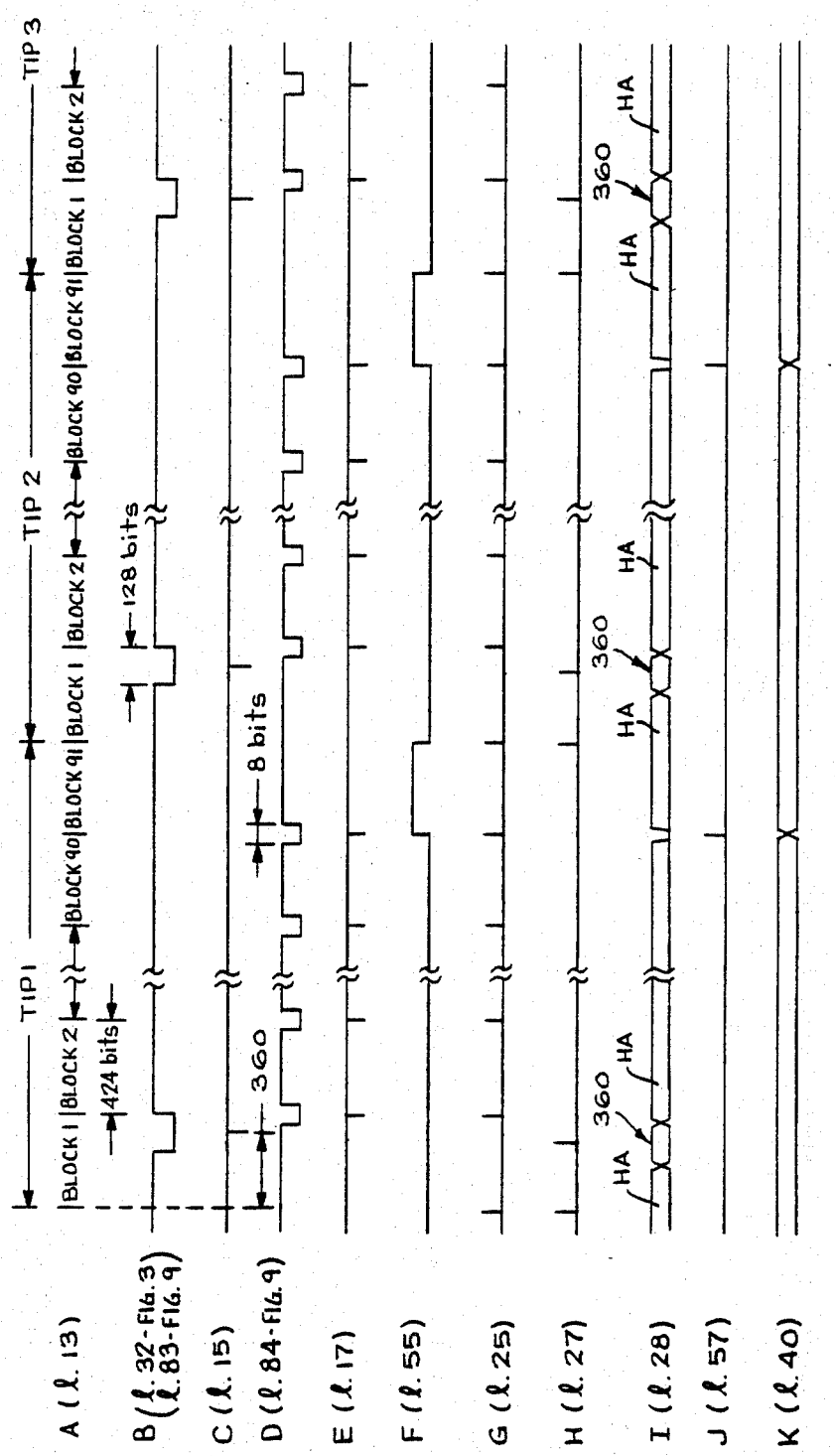
FIG_4

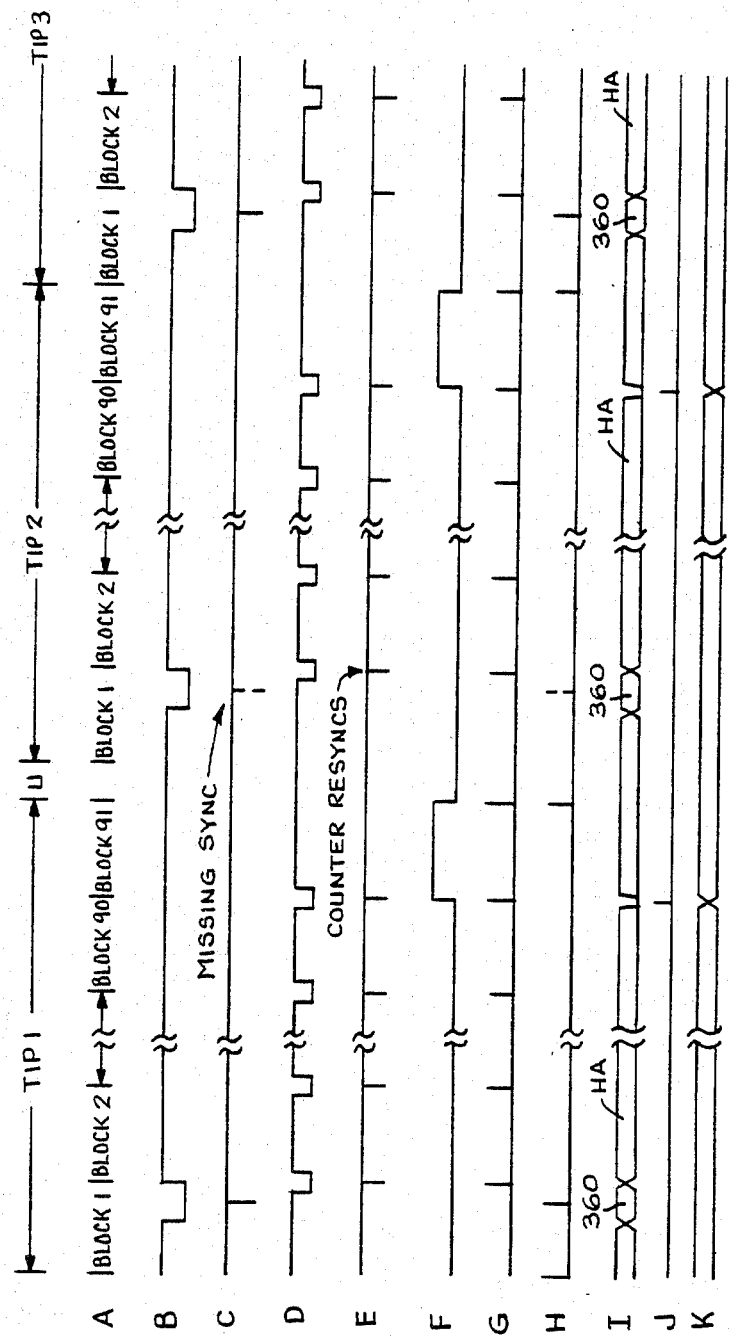

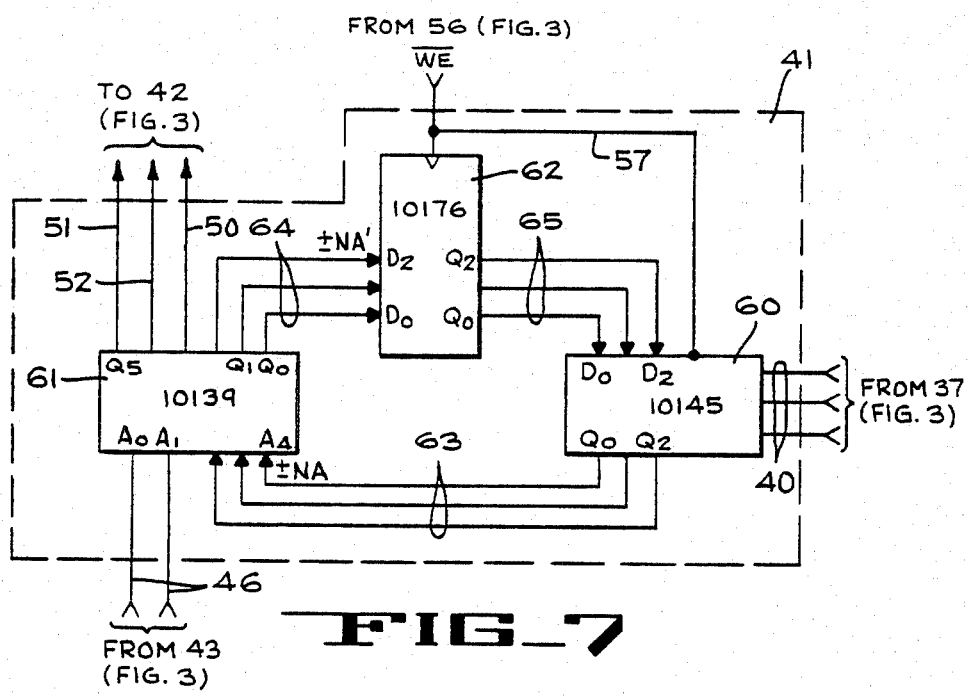
FIG_7
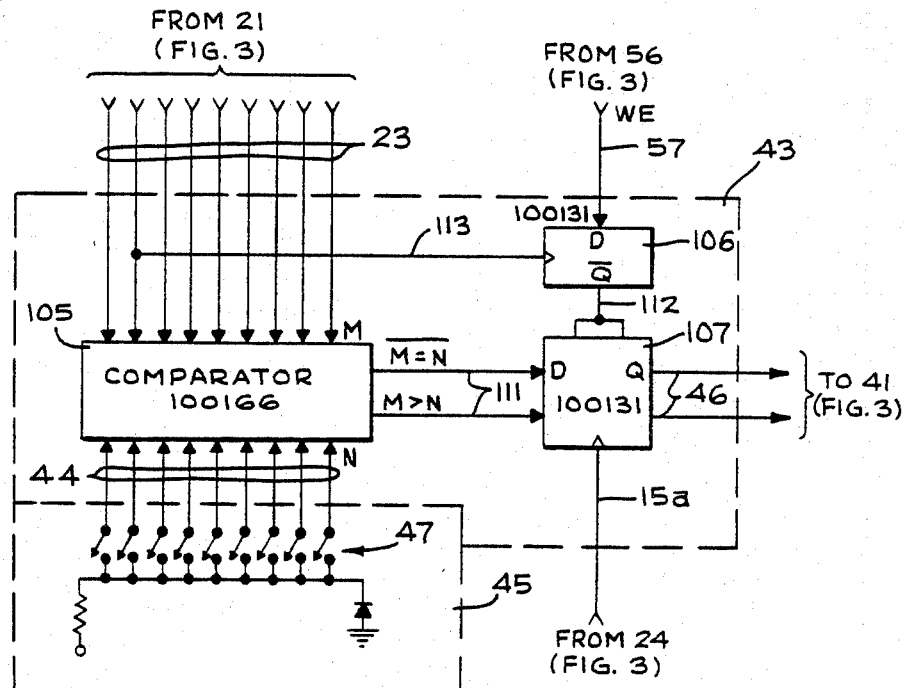
FIG_10

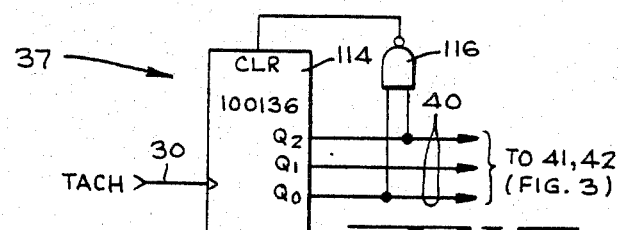
FIG_11A
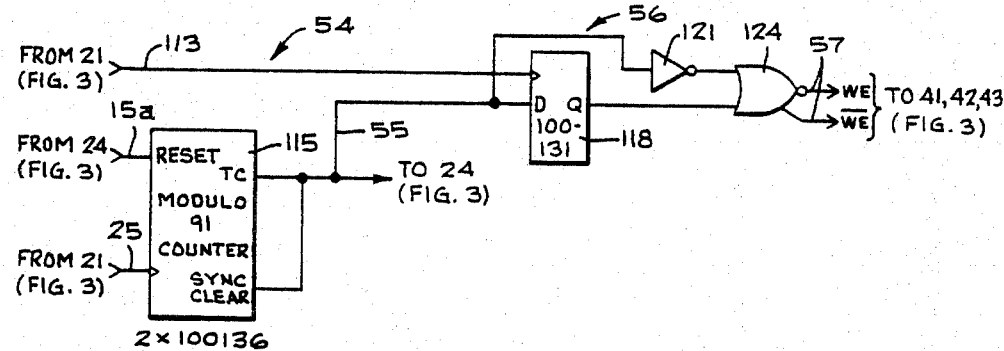
FIG_11B
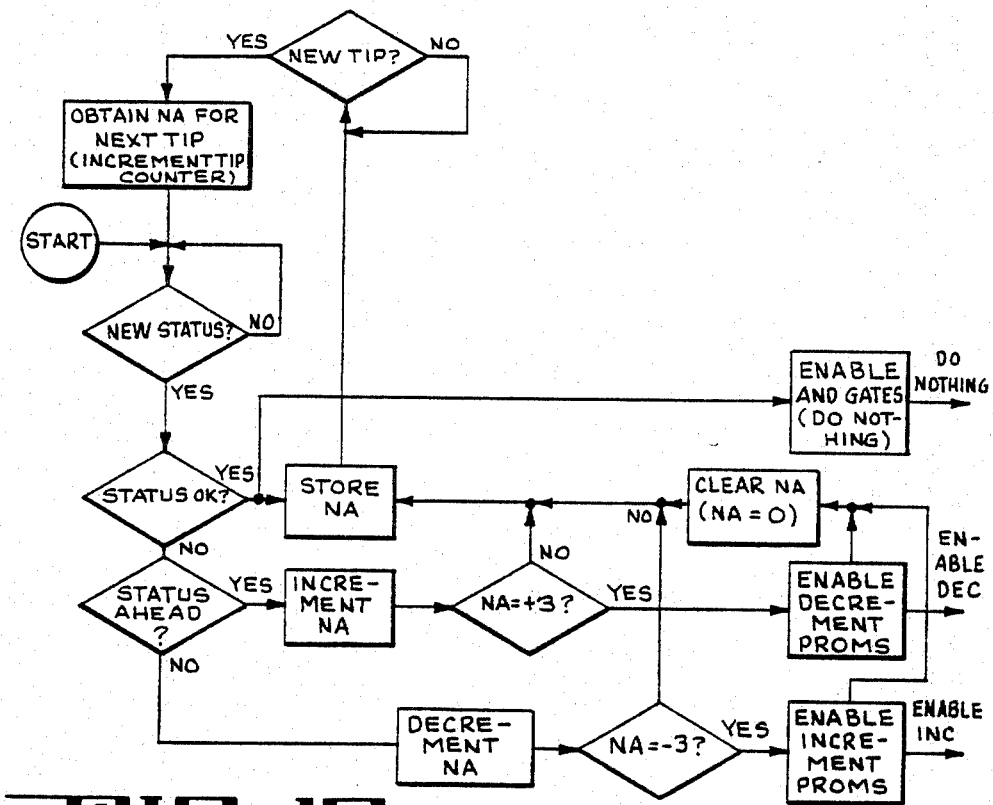
FIG_12

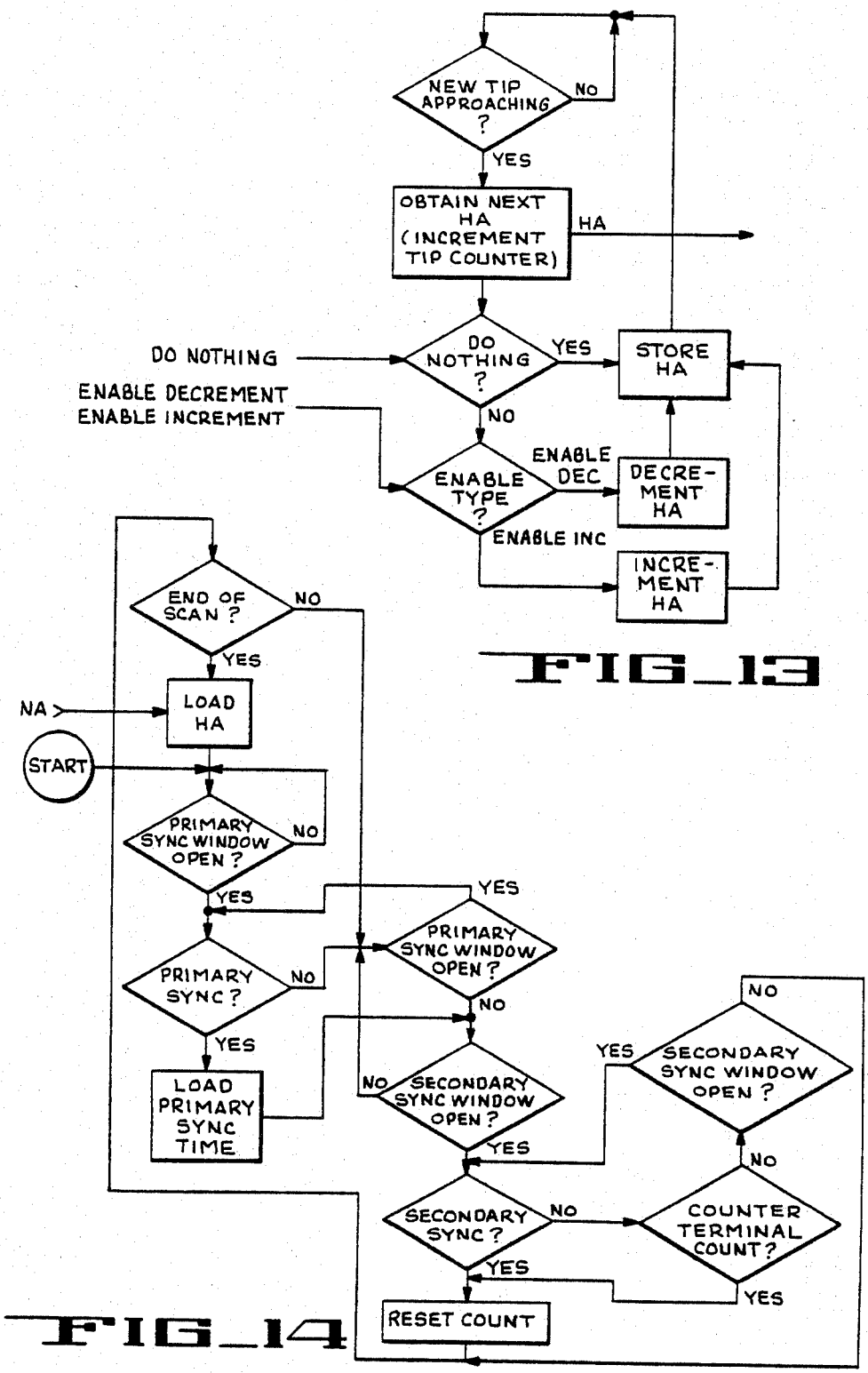

SYSTEM AND METHOD FOR SYNCHRONIZATION OF ROTARY HEAD MAGNETIC RECORDING/REPRODUCING DEVICES

BACKGROUND OF THE INVENTION

The invention described herein was made in the course of Contract No. F 33657-81-C-1032 awarded by the United States Government.

The invention relates to a system and method for synchronization of high frequency digital signals reproduced from a magnetic medium, utilizing rotary head recording/reproducing devices.

Rotary head magnetic recorders, for example of the transverse or helical scan type such as used in video, instrumentation or other recording applications, are known to utilize transducers inserted in a rotating drum and equidistantly spaced along the periphery thereof. The drum rotates at a relatively high speed while a magnetic tape passes adjacent to the drum at a relatively low speed and each record or reproduce transducer sweeps across the tape in a predetermined path generally referred to as a track. When reproducing high frequency digital signals from a magnetic medium it is essential to obtain synchronization of the reproduced signal with the original recording to avoid loss or distortion of the information content. To obtain the foregoing it is known to insert a known synchronization word into the information data stream to be recorded at the beginning of each track. Further synchronizing signals are known to be interleaved with the information signal and recorded on each track to obtain additional synchronization.

As well known, the above-mentioned synchronization word, also referred to as correlation word, generally consists of a block of data having a predetermined length and a known sequence of bits. At playback the correlation word is detected by a known digital correlator which responsively generates a synchronization signal in a well known manner. The synchronization signal in turn activates a control circuit which provides the desired synchronization of the reproduced data.

To obtain precise uniformity of the recorded tracks it is necessary, besides other well known criteria to accurately space the respective heads around the rotating drum. Prior art transverse scan magnetic recorders are known to utilize four equidistant transducers arranged 90 degrees apart around a rotating drum. However, due to minute differences in the spacing of these transducers timing errors occur in the recorded signals, generally known as "quadrature errors" with respect to the four heads utilized. In prior art analog recorders transducer misalignment for example in the order of ±100 microinches is acceptable and may be corrected by state of the art time base correctors.

However, when recording and reproducing high frequency digital signals for example over 100 MHz by rotary head recorders for example of the transverse scan type it is necessary to obtain digital synchronization of the reproduced signal before time base correction can be applied. Due to quadrature errors some heads may start recording on the parallel tracks earlier or later than specified for the particular type of recorder. When the thusly recorded signal is played back the synchronization word is shifted in time and consequently synchronization of the playback data may be obscured and the information content distorted. The foregoing timing errors are augmented when different transducer drums are utilized for recording and playback, respectively.

Loss of playback information may occur also when the synchronization word is not identified by the correlator due to relatively low signal to noise ratio. When the synchronization signal is not detected at the beginning of each playback track the additional synchronization signals which are interleaved with the recorded information may not be identified because of the timing errors in the signal introduced by the quadrature errors.

Reduction of quadrature errors to an acceptable magnitude in high density recorders by mechanical means would require maintaining head-to-head spacing with accuracy of a fraction of a bit cell. The latter however is an unreasonable mechanical goal as packing densities increase whereas digital correction of these errors allows achievable mechanical tolerances.

SUMMARY OF THE INVENTION

Accordingly, it is an object of the present invention to provide a system and method for synchronization of digital signals reproduced from a magnetic medium utilizing rotating head magnetic recording/reproducing devices in which the above-indicated disadvantages are eliminated.

In accordance with the present invention a data format counter is utilized to count the number of data bits corresponding to the length of each data track of the playback signal. The output from the counter is compared in a status comparator with a normal count at which a primary synchronizing signal ideally occurs, that is when there is no timing error with reference to the end of an immediately preceding track. The status comparator indicates the direction of a timing error between consecutive tracks. A correction signal for each head pass is stored in a memory and updated depending on the direction of the output signal from the comparator. The updated correction signal is applied to offset the block format counter to reduce the timing error.

When the synchronization signal at the beginning of each track is detected the format counter is synchronized therewith. However when that synchronization signal cannot be detected the format counter instead will be synchronized by the above-described correction signal stored in the memory.

A status accumulator is also utilized in the preferred embodiment to eliminate the effect of short term dynamic errors from the static timing errors. The accumulator receives the respective output signals from the status comparator for each tip and it provides a control signal to update the memory only when a predetermined number of respective timing errors in the same direction has been detected for the same tip.

BRIEF DESCRIPTION OF THE DRAWINGS

FIG. 1 is a diagramtic illustration showing a rotary head assembly and associated magnetic medium;

FIG. 2 is a view taken along line 2—2 of FIG. 1;

FIG. 3 is a block diagram of a system in accordance with the preferred embodiment of the invention;

FIGS. 4A to 4K are timing diagrams illustrating normal operation of the preferred embodiment. These Figures are referred to generally as FIG. 4.

FIGS. 6A to 6K are timing diagrams showing the effect of timing error correction. These Figures are referred to generally as FIG. 6.

FIG. 7 is a schematic diagram showing the status accumulator of FIG. 3.

FIG. 10 is a schematic diagram showing the status comparator and word storage of FIG. 3.

FIG. 11A is a schematic diagram showing the tip counter of FIG. 3.

FIG. 11B is a schematic diagram showing the block counter and write enable generator of FIG. 3.

FIGS. 12 to 14 are simplified flow diagrams showing the flow of operation of various portions of the system of FIG. 3.

DETAILED DESCRIPTION

Figure 5:
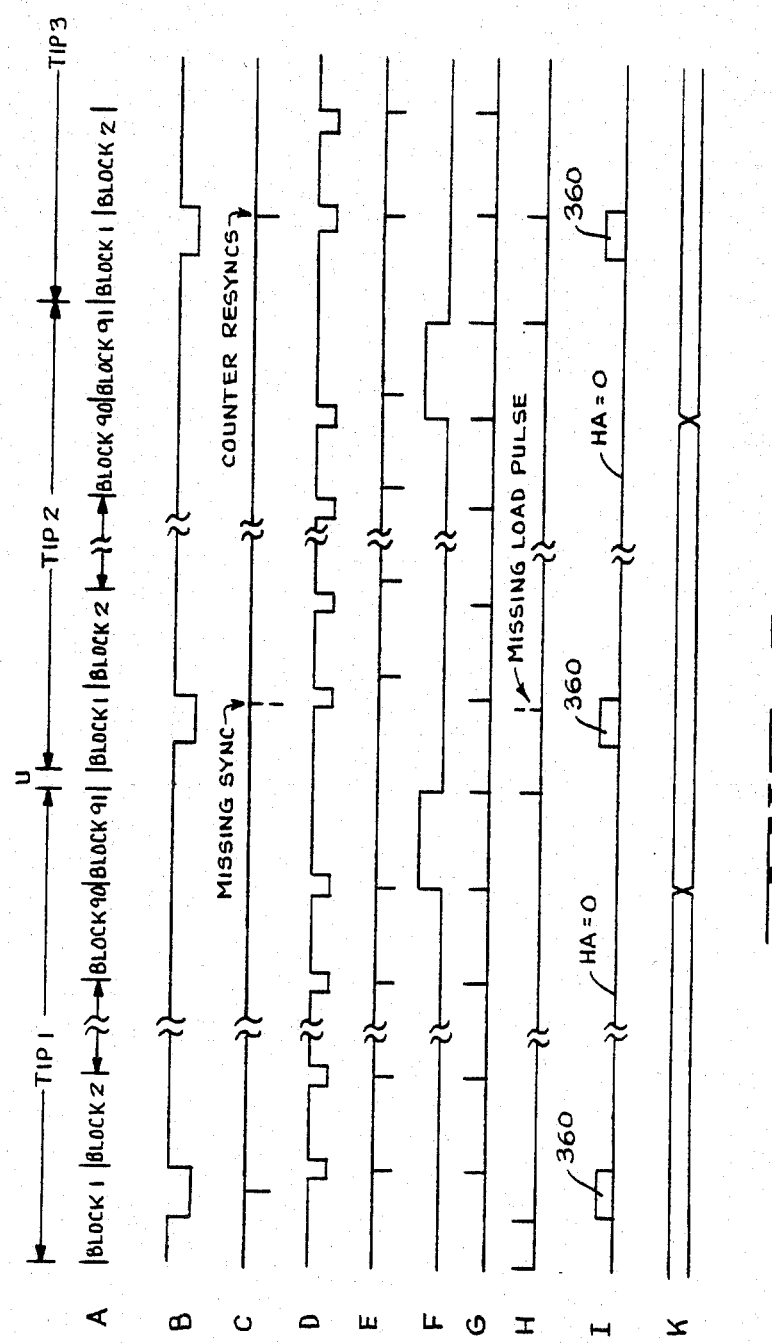
FIGS. 5A to 5K are timing diagrams showing the effect of the lack of synchronization when timing error correction is not provided. These Figures are referred to generally as FIG. 5.

In the herein described preferred embodiment an information data stream is recorded, for example at a frequency 120 MHz on a one inch wide magnetic tape by a transverse scan rotary recorder. The recorder has preferably six transducers 16a to 16f equidistantly spaced around the periphery of a rotating drum assembly 10 as shown in FIGS. 1 and 2. It will be understood, however, that the number of transducers and other parameters may differ depending on the particular recording/reproducing application. For example four, eight or any other suitable number of transducers may be utilized. Each transducer, also referred to as rotating head or tip, in sequence sweeps across the magnetic tape 12 moving in the direction of arrow 26 while data are recorded on or played back from the tape as well known in the art. The respective transducers are switched on when positioned over the recording tape and they are switched off when leaving the tape. With reference to previously described "quadrature" errors associated with four equidistant rotating tips it will be referred to similar timing errors occurring in the preferred embodiment as "hexature errors" with respect to the six tips utilized. When the assembly 10 is in recording mode, a plurality of parallel tracks is recorded on tape 12 of which six tracks 20a to 20f repeat periodically during each complete rotation of assembly 10, defining a track sequence 22. Each track 20a to 20f is associated with a different head 16a to 16f as well known in the art.

As an example of previously mentioned inaccurate spacing around the periphery of the rotating drum 10, heads 16d and 16b are shown in FIG. 2 as having respective angular misalignments of +S1; −S2 degrees from a 60 degree reference angle between these and immediately preceding heads 16e; 16c in the direction of rotation 18 of drum 10. The respective angles +S1, −S2 are for example in the order of ±0.01 degrees. Due to the above described misalignments the beginning of track 20b recorded by head 16b will be offset by a length +T1, that is in a positive direction and the beginning of track 20d by a length −T2 that is in a negative direction with respect to a reference line 11 indicating the beginning of tracks recorded by precisely aligned heads. For example, in the preferred embodiment the lengths T1, T2 may be in the order of 140 microinches.

The preferred embodiment of the system and method for synchronization of rotary head devices in accordance with the invention will be described now with reference to the block diagram in FIG. 3 and respective timing diagrams shown in FIGS. 4 to 6. In this example the recorded data format is as follows. Each track of recorded data comprises 91 consecutive data blocks, each block having a fixed length of 424 bits, as shown in FIG. 4A. The first data block of each track comprises a synchronization word, also referred to as correlation word, whose length is 128 bits and which word has been inserted into the information data stream in a well known manner prior to recording each track. The correlation word has a known sequence of data bits as it is known in the art. At playback the data is recovered by a magnetic reproducing device similar to the recording device in a well known manner. The recovered data A is applied via line 13 to a digital correlator 14 shown in FIG. 3. Preferably a digital correlator is utilized of the type described in a copending U.S. patent application Ser. No. 342,257, commonly assigned to Ampex Corporation or alternatively a well known state of the art correlator may be utilized.

It is noted that the respective alphabetical references A to K designating signals whose timing diagrams are shown in FIGS. 4 to 6 are also indicated at corresponding locations in FIG. 3 to facilitate cross reference. Similarly, respective line numbers indicating lines in FIG. 3 carrying these various signals are also cross referenced in the timing diagrams of FIGS. 4 to 6.

The correlator 14 upon detecting the correlation word in the off-tape data stream generates a synchronizing pulse C, further referred to as primary sync or track sync on line 15, which normally coincides with the middle of the correlation word, that is with its 64th bit, as it is shown in FIG. 4C. In addition, the correlator 14 generates a secondary sync E on line 17, coinciding with the beginning of the data blocks, as shown in FIG. 4E. The correlator 14 also receives on line 19 a system clock signal recovered from tape which is synchronous with the data on line 13 and has the same frequency of 120 MHz. The correlator 14, besides providing the above-described primary and secondary sync on lines 15, 17 respectively, also provides re-clocked data on line 13a and a clock signal on line 104, which latter signals are synchronous with the sync signals on lines 15, 17. The clock signal on line 104 is applied to the respective devices of FIG. 3 to obtain synchronization as well known in the art.

A data format counter 21 preferably implemented by a free running presettable block format counter is utilized to count normally from zero to the number of data bits utilized in each block, that is, from 0 to 423 in the preferred embodiment. The counter 21 may be preset to a correction value updated by the timing error and stored in a memory to compensate for the timing errors as it will follow from further description. The counter keeps track of the reproduced digital signal components from each track, including data, synchronization signals, data error correction signals, etc. Both the primary and secondary sync on lines 15, 17 respectively, are utilized to synchronize the block format counter 21 and the other devices as it will be described later.

The count M from counter 21 on line 23 as well as its terminal count G on line 25 shown in FIG. 4G, are respectively applied to a control logic circuit 24, which also receives the primary and secondary sync via lines 15, 17, respectively. The control logic circuit 24 generates internally primary and secondary sync window pulses B, D or shortly "windows" in response to the count on line 23 as shown in FIGS. 4B and 4D, respectively. These "windows" are necessary to eliminate response to erroneous correlations in the data stream. In this example the primary sync window B is 128 bits wide and the secondary sync window D is 8 bits wide. It is seen from FIGS. 4B to 4E that ideally the primary and secondary sync occur in the middle of their respective windows.

When the primary sync on line 15 is received by circuit 24 within the duration of the primary sync window B of FIG. 4B, the control logic circuit 24 outputs a load control signal H on line 27 to the block format counter 21 as shown in FIG. 4H. In response to the load control signal H the counter 21 loads an input signal I on line 28 as shown in FIG. 4H and will be described below.

A tachometer input signal received on line 30 is derived from the rotational movement of the rotating drum assembly 10 shown in FIG. 2 in a manner well known in the art. In the preferred embodiment six tachometer pulses are obtained serially during a complete rotation of drum 10, that is one tachometer pulse is obtained just before the beginning of each sweep of the recording medium 12 by each transducer 16a to 16f, respectively.

The tachometer pulses on line 30 are applied to a window generator 31, preferably implemented by monostable multivibrators, which responsively provide on line 32 pulses corresponding to primary sync windows B shown in FIG. 4B. The signal on line 32 controls switching of the input signal I on line 28 of block format counter 21 as it is represented by a switch 33 connected in that input line 28 as follows.

A fixed word storage 34 contains a fixed binary number corresponding to the number of bits from the beginning of the first data block which also corresponds to the end of the last data block of an immediately preceding track, at which the primary sync on line 15 normally occurs, that is, when no hexature error occurs. In the preferred embodiment the fixed binary word stored in word storage 34 is equal to 360 bits. Word storage 34 applies that output via line 35 to the switch 33.

At the beginning of each primary sync window B switch 33 is controlled via line 32 to connect input line 28 of counter 21 with output line 35 from word storage 34. Shortly thereafter a load control signal H on line 27 is applied from the control circuit 24 synchronously with primary sync C on line 15 during the primary sync window on line 32. Consequently the binary counter 21 is preset via line 28 to 360 bits which count corresponds to normal occurrance of primary sync C on line 15 as it has been described and is seen from FIG. 4. It is seen from the foregoing description with reference to FIG. 4 that during normal operation the format counter 21 is synchronized upon recieving each primary sync on line 15.

Each secondary sync on line 17 provides additional synchronization of the playback signal on each track of recorded information, to compensate for possible slippage of the off tape clock, as follows. When a secondary sync E on line 17 as shown in FIG. 4E is received by the control circuit 24 during a secondary sync window provided by that circuit and as shown in FIG. 4D the block format counter 21 resets via line 103 synchronously to zero. Alternatively the block format counter 21 is reset to zero via line 103 in response to its own terminal count G on line 25. The latter terminal count is shown in FIG. 4G. It is seen from FIGS. 4E and 4G that when counter 21 is properly synchronized the terminal count on line 25 and secondary sync on line 17 coincide at the beginning of each block of data shown in FIG. 4. Similarly, when the primary sync on line 15 is present the format counter 21 will be synchronized thereby at the beginning of each head pass as it has been described above.

In case the primary sync C on line 15 is not generated by the correlator 14, for example due to excessive noise in the reproduced data on line 13 and consequent inability of the correlator to identify the correlation word at playback, the counter 21 will reset at each terminal count to zero as described before but it will not preset to 360 in response to the primary sync at the beginning of each track of reproduced data. The latter case is shown in the timing diagrams of FIG. 5 where the primary sync C is shown by a dotted line as missing during the primary sync window B of tip 2. Since the control circuit 24 will not apply load signal H on line 27 to preset block format counter 21 by the fixed value of 360 bits as above described, the counter 21 would subsequently fall out of synchronization. As a result, the secondary syncs E possibly will not occur during the secondary sync windows as shown in FIGS. 5E and 5D.

In other instances when a hexature error occurs, such as shown at "U" in FIG. 5A, the secondary syncs on line 17 shown in FIG. 5E may also fall outside the range of the secondary sync windows provided by the control circuit 24 and shown in FIG. 5D. Consequently when no timing error correction is provided as shown in FIG. 5, counter 21 will fall out of synchronization with the previously mentioned playabck signal on line 13a of FIG. 3.

The above described loss of synchronization is eliminated by the synchronization system and method of the present invention as it will follow from further disclosure with reference to FIG. 6. In accordance with the preferred embodiment of FIG. 3 the tachometer pulses on line 30 are further applied to a tip counter 37 which is implemented as a modulo 6 counter. The count K from tip counter 37 shown in FIG. 6K addresses via line 40 both a status accumulator 41 and a hexature memory 42, respectively, whose respective operations will be described below.

A digital status comparator circuit 43 at one input receives via line 23 the previously described output signal M from format counter 21. At a second input circuit 43 receives via line 44 a fixed binary value N stored in a fixed word storage 45 which value in the preferred embodiment is preset to N=360. Thus as follows from the previous description value N corresponds to the middle of the correlation word of each recorded track and it coincides with the primary sync C on line 15 if there is no hexature error as it has been described previously with reference to FIG. 4. The comparator 43 continuously compares the respective signals M and N and it provides an output signal on line 46 therefrom at the time of receiving the primary sync C on line 15. Thus the signal on line 46 indicates at the beginning of each head pass whether the count from the format counter 21 is on time, ahead or behind with respect to the off tape primary sync on line 15. In the preferred embodiment of FIG. 1 the following bit combinations on line 46 are utilized:

TABLE 1

| Signal on line 46 | Status of block format counter 21 |
| --- | --- |
| 11 | M < N counter behind |
| 01 | M > N counter ahead |
| 00 | M = N counter correct |
| 10 | combination not allowed |

The signal on line 46 is applied to the status accumulator circuit 41 which is utilized to distinguish static timing errors from dynamic timing errors as follows. As it is well known dynamic timing errors such as caused by servo instability, mechanical jitter of the rotating drum, etc. which vary at subsequent head passes in either direction, are relatively small in comparison with quadrature, hexature or analogous timing errors which are of static nature. Therefore it is desirable to ignore these dynamic errors when providing hexature error averaging. To the latter effect the accumulator 41 provides an output signal on one of the lines 50 or 51 only after a timing error in the same direction has been detected for a particular head during a total of four passes over the tape. The status accumulator 41 is programmed to count the number of head passes for each head during which the difference between values M and N has the same sense or direction. When a deviation in one direction with respect to a particular head is detected during four passes a corresponding output signal is provided on line 50 or 52 as follows. When M<N, that is when the counter 21 is behind, as shown in Table 1, an output signal on line 50 is provided which in turn enables an incrementing stage of the hexature memory 42. Analogously when M>N, that is when the counter 21 is ahead, an output signal on line 52 enables a decrementing stage of memory 42. Finally, when M=N, an output signal on line 51 enables a "do nothing" stage of the hexature memory 42.

The hexature memory 42 is utilized to store and update an average hexature error correction value HA in the form of a count to which the format counter 21 is preset at the beginning of each head band pass over the magnetic medium. Consequently, at the beginning of a playback operation the hexature memory 42 stores a zero value for each tip 16a to 16f. During playback, when the above mentioned deviations are detected by the comparator 43, the initial value stored in memory 42 is updated whenever there is a signal on line 50 or 52 from accumulator 41, respectively. When one of the incrementing or decrementing stages of memory 42 is enabled via lines 50, 52, respectively, the currently stored value therein is incremented or decremented by one. The thusly incremented or decremented value represents an average hexature error correction value HA and it is stored in hexature memory 42 until further change thereof. In case the "do nothing" stage is enabled via line 51, the stored signal in memory 42 stays unchanged.

The hexature error correction value HA is then applied via line 53, previously described switch 33 and line 28 to counter 21. The latter value HA represents a count to which the counter 21 is preset in response to a control signal on line 27 at the end of each head scan as it is now described below.

Now a control operation will be described which effects presetting the block format counter 21 to that value HA stored in the hexature memory 42. A data block counter 54 is utilized, which in the preferred embodiment is implemented as a modulo 91 counter with respect to the number of data blocks utilized. The data block counter 54 receives on line 25 the previously mentioned terminal count G shown in FIG. 6G from format counter 21 and it provides an output pulse F on line 55 shown in FIG. 6F coincident with the duration of the last data block that is of the 91st block of each reproduced track of data. The signal on line 55 is applied to a write enable generator 56 which provides in response thereto a write enable pulse J on line 57 shown in FIG. 6J. As it is seen from FIG. 3 the pulse J on line 57 is applied to hexature memory 42, status accumulator 41 and status comparator 43, respectively. The signal J on line 57 enables the status accumulator 41 to enter the output signal on line 46 from status comparator 43, subsequently clears the status comparator and enables the hexature memory 42 to enter the updated signal HA for storage therein in response to one of the control signals on lines 50 to 52, respectively.

The above-described pulse F on line 55 is also applied to the control logic circuit 24 which in response thereto and coincidentally with the terminal count on line 25 applies a load signal on line 27 to the block format counter 21, as it is seen from FIGS. 6F to 6H. Consequently, the signal on line 28 which during the last block represents the HA signal from memory 42 presets the format counter 21 as shown in FIG. 6I. The counter 21 then starts to count from that initial count until it is reset by the signal on line 103 as described previously.

It is seen from the foregoing description with reference to the timing diagram of FIG. 6 that when one or more primary sync signals C are missing as shown in FIG. 6C during the scan provided by tip 2, the counter 21 cannot preset synchronously to 360 bits as during normal operation. Instead, the counter 21 will preset periodically at the end of the last data block to the hexature error correction value HA. Consequently, the operation of the counter 21 is maintained in close synchronism with the playback data A until generation of primary sync C or secondary sync E is resumed by the correlator 14.

To provide a more detailed description of the preferred embodiment, the various devices shown in the block diagram of FIG. 3 and their respective operations will now be described with reference to FIGS. 7 to 14, respectively. To facilitate comparison, like elements are designated by like reference numerals throughout the drawing Figures.

FIG. 7 is a more detailed schematic diagram of the status accumulator 41 of FIG. 3. It comprises a RAM 60, for example type 10145 a PROM 61, for example type 10139 and a latch 62, for example type 10176. The respective input and output lines 40, 46, 50 to 52 and 57 of the status accumulator 41 respectively shown in FIG. 7 correspond to those previously described with reference to FIG. 3. Thus the RAM 60 receives on lines 40 the previously described tip count K 1 to 6 from tip counter 37 of FIG. 3 addressing the stored value therein pertaining to one of the rotating heads 16a to 16f. The RAM 60 provides on line 63 a signed integer ±NA having a value from −3 to +3 indicating for the currently addressed head 16a to 16f the total number of hexature errors that occurred in the same direction. A positive sign "plus" indicates a positive hexature error, corresponding to a status M>N on lines 46 while a negative sign "minus" indicates a negative hexature error, that is when M<N. It is noted that two lines 63 are utilized for the binary notation and the third line denotes the sign. PROM 61 receives the signal ±NA on lines 63 and it also receives the above-indicated status signal on lines 46 from status comparator 43 of FIG. 3 as previously described with reference to Table 1. Depending on the value of the status signal on lines 46 PROM 61 adds or subtracts a binary one from the signal ±NA on lines 63 and applies the thusly updated value NA' via lines 64 to latch 62. Latch 62 stores the latter value NA' until a previously described write enable signal WE is obtained via lines 57 from the write enable generator 56 of FIG. 3 which in turn effects replacing the previously stored value ±NA in RAM 60 by the updated value ±NA'. It will be understood from further description that when the value NA' equals to +3 or −3 respectively, a corresponding output signal on lines 52 or 50 from PROM 61 is generated and the stored value in RAM 60 is reset to zero for that particular head.

Figure 8:
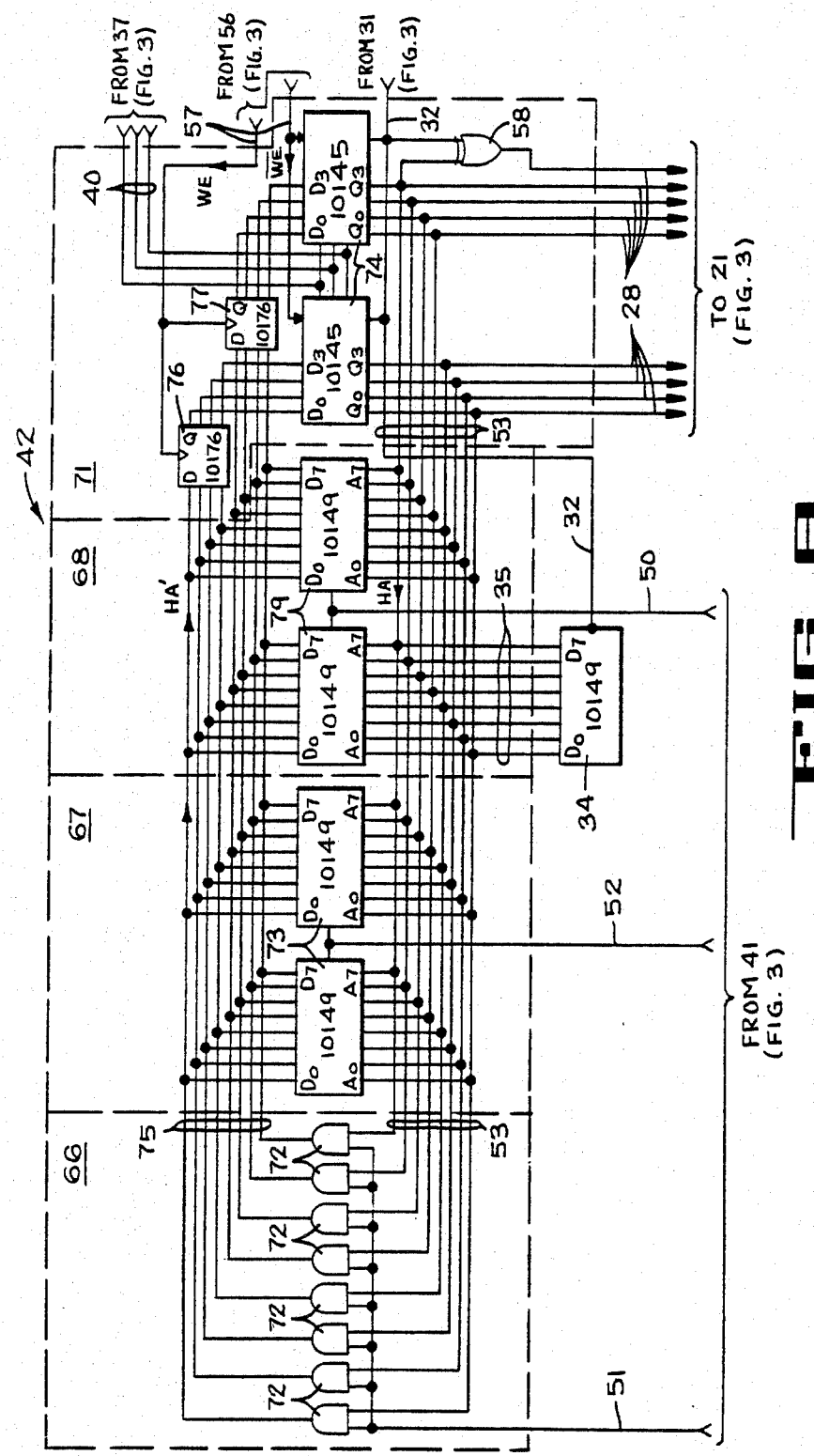
FIG. 8 is a schematic diagram showing the correction signal memory of FIG. 3.

When the output signal on lines 64 is equal to +3 or −3 and the signal received on line 46 indicates hexature error in the same direction then PROM 61 provides a corresponding output signal on one of the lines 50 or 52 as previously described. If the absolute value of the signal on lines 64 is less than 3 then PROM 61 applies a "do nothing" control signal on line 51. The respective signals on lines 50 to 52 are applied to the hexature memory 42 whose detailed diagram is shown in FIG. 8 and will be described later.

The foregoing operation of the status accumulator 41 is further illustrated by the following example described below with reference to FIGS. 3 and 7. Let us suppose that a particular playback head of a rotary transverse recorder/reproducer such as head 16d shown in FIG. 2 has a static time base error, also referred to as hexature error, of M>N equal to +4 bits, while the dynamic error is neglected. Let us further suppose that presently the hexature memory 42 has a zero average hexature error correction value HA stored therein for that particular head. After the next pass of that transducer over the tape the comparator 43 detects a positive timing error since the format counter 21 counted to 364 instead of to 360 when the primary sync pulse on line 15a occurred. Thus the output signal on line 46 indicates that M>N as shown in Table 1. Correspondingly, the signal ±NA on line 63 of FIG. 7 is zero and the PROM 61 applies +1 via lines 64 into latch 62 for that particular tip. The latched signal +1 is then stored in RAM 60 in response to signal WE on line 57. If during a following pass of the same head the PROM 61 receives a signal on lines 46 indicating M=N that is, indicating no hexature error, the currently stored signal in RAM 60 is maintained at +1. If during a following pass of the same head the PROM 61 receives a signal on lines 46 indicating M>N, that is indicating negative hexature error, the currently stored signal in RAM 60 is decreased by 1 returning to zero. In the above instances an output signal on line 51 from the accumulator 41 will enable the "do nothing" stage of hexature memory 42 of FIG. 3. Let us suppose now that a total number of three pulses indicating M>N is being stored in RAM 60 for a particular head and an additional pulse indicating the same status is received by PROM 61 via lines 46. PROM 61 then applies a control pulse on line 52 which enables the decrementing stage of hexature memory 42 which stage in turn decrements by 1 the presently stored value HA in the hexature memory 42. If that presently stored value is zero the resulting updated value is equal to one less than zero, which in the case of the data format utilized is 423 bits, since in this example the status of 0 bits is the same as a status of 424 bits with respect to the free running counter 21 of FIG. 3. Consequently, before the next head pass of that particular head the output HA on line 53 from memory 42 will be 423, instead of 0 that is the counter 26 will count one bit more than before. Thus the comparator 43 will again detect a positive error since the primary sync on line 15a will arrive at a count equal to 363 bits. If the same error is indicated subsequently three more times the stored HA value in memory 42 will be next decremented by 1 and the error decreased to +2 bits, than to +1 bit and finally to zero. When the error detected by comparator 21 is zero, that is M=N, which case corresponds to the primary sync on line 15a coinciding with the count 360 both on line 23 from counter 21 and on line 44 from word storage 45, the PROM 61 of accumulator 41 enables the "do nothing" stage via line 51 which stage then returns the currently stored value HA into the memory 42 unchanged.

It will be understood from the foregoing example that correction of a hexature error in the opposite sense when M<N will be provided analogously, utilizing the incrementing stage of hexature memory 42.

The above described operation of the status accumulator 41 of FIG. 7 is further exemplified by a flow chart shown in FIG. 12 which conceptually describes that operation. The latter operation of the status accumulator 41 may be best controlled by a microprogram contained in PROM 61, based on that flow chart, as it is well known in the art.

A detailed circuit diagram of the hexature memory 42 of FIG. 3 is shown in FIG. 8 and will be described now. In the preferred embodiment the hexature memory 42 is implemented by a "do nothing" stage 66, a decrementing stage 67, an incrementing stage 68 and a hexature error storage stage 71. The "do nothing" stage 66 comprises eight AND gates 72, for example implemented by integrated circuit elements type 10104. One input of each gate 72 is interconnected to receive the "do nothing" control signal on line 51 from status accumulator 41 which signal has been described previously with reference to FIG. 7. Each AND gate 72 receives at its other input one bit of an 8-bit output signal HA provided on lines 53 from the HA error storage 71 as shown in FIG. 8, and which lines correspond to the previously described output line 53 from the hexature memory 42 of FIG. 3. The respective outputs from gates 72 are returned, via lines 75, to the HA error storage 71.

The decrementing stage 67 and the incrementing stage 68 each comprises two PROM's 73, 79, respectively, preferably type 10149. The output signal on lines 53 from storage 71 addresses the PROM's 73, 79 respectively and the respective updated output signal therefrom is returned via lines 75 back to storage 71 where it replaces the old HA value, as described previously.

The HA error storage 71 is implemented by two RAM's 74, preferably type 10145 and two quad D flip-flops 76, 77, preferably type 10176. The RAM's 74 are utilized to store the hexature error correction value HA as above described and to apply the currently stored value via lines 53 and 28 to the block format counter 21 as well as to the respective stages 66 to 68 of the hexature memory 42. Depending on which one of the control lines 50 to 52 from the previously described status accumulator 41 is activated, one of the latter stages is enabled to update the signal HA on line 53 as follows. When stage 66 is enabled via line 51 gates 72 return the unchanged signal on lines 53 to storage 71 via lines 75.

When decrementing stage 67 is enabled via line 52, PROM's 73 decrement the value of HA on lines 53 by one and return the resulting value of HA' to storage 71 via lines 75. Analogously, when incrementing stage 68 is enabled via line 50, PROM's 79 increment the signal value HA on lines 53 by one and return the thusly updated signal HA' to storage 71 via lines 75. The thusly updated signal HA' on lines 75 is first applied to flip-flops 76, 77 for temporary storage and it is subsequently entered into RAM's 74 in response to the previously described write enable signal WE on lines 57. The thusly updated value HA' replaces the previously stored value HA in RAM's 74.

The previously described switch 33 of FIG. 3 is implemented in the embodiment of FIG. 8 as follows. During the primary sync window B on line 32 as shown in FIG. 6B the fixed word storage 34, preferably implemented by a PROM type 10149, is enabled and the fixed word therefrom is loaded via lines 35 and 28 interconnected therewith into the previously described block format counter 21 of FIG. 3. When at the end of each primary sync window B the fixed word storage 34 is disabled the hexature error correction value HA on lines 53 is loaded into counter 21, as best shown in the timing diagram of FIG. 4. It follows from the foregoing disclosure that switch 33 of FIG. 3 is in fact implemented in FIG. 8 by utilizing the control signal on line 32 to load an output signal from word storage 34 into the block format counter 21 during the primary sync window immediately following loading of the value HA on line 53 therein as best shown in FIG. 4I.

Consequently, when the primary sync on line 15 is missing, as it is for example shown in FIG. 6C, the counter 21 already has been loaded by the hexature error correction value via lines 53 and 28. The counter 21 then will reset in response to its terminal count via lines 25, control logic circuit 24 and lines 103 as it will be described in more detail in the reference to FIG. 9.

In the particular implementation of FIG. 8 an EXOR gate 58 is utilized to invert the most significant bit of the count on lines 28 to obtain a 9-bit input required by counter 21 from an 8-bit output of RAM's 74.

The above-described operation of the hexature memory 42 of FIG. 8 is further exemplified by a flow chart shown in FIG. 13 which conceptually describes that operation.

Figure 9:
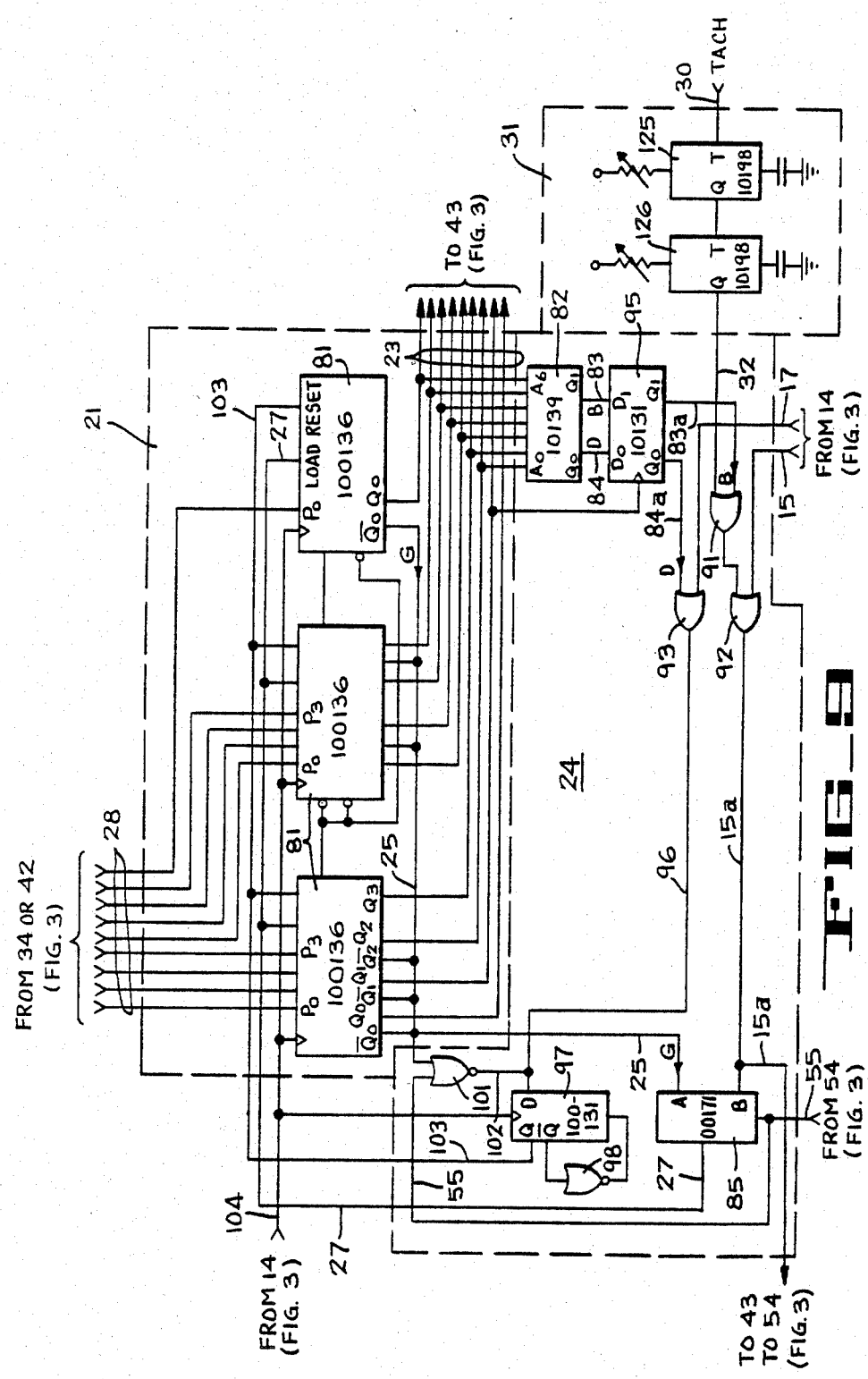
FIG. 9 is a schematic diagram showing the block format counter, associated control logic and window generator of FIG. 3.

FIG. 9 shows a detailed diagram of the block format counter 21 preferably implemented by presettable counters 81 type 100136 and of the control logic circuit 24 associated with the counter 21 which respective devices have been described with reference to FIG. 3. In the preferred embodiment counters 81 count from zero to 423 when no hexature error is detected. The count from counters 81 is continuously applied via lines 23 to a sync window generator 82, preferably implemented by a PROM type 10139. The count on lines 23 addresses PROM 82 which in turn provides on line 83 primary window pulses shortly "windows", each 128 bits wide. The pulses on line 83 correspond to the previously described pulses shown in FIG. 4B, however they are derived from count 23 and therefore their timing is more accurate. PROM 82 provides secondary window pulses on line 84, each 8 bits wide, as shown in FIG. 4D. It is seen from FIGS. 4A to 4E that the primary sync, received on line 15, ideally occurs in the middle of the primary window pulses and secondary sync received on line 17 occurs in the middle of secondary window pulses.

With further reference now to the timing diagrams of FIG. 4, when the terminal count G on line 25 from counters 81 is received by a multiplexer 85, such as implemented by type 100171, during the pulse on line 55 from block counter 54 of FIG. 3, which pulse coincides with the last block 18 of the data track as shown in FIG. 4F, then the multiplexer 85 applies a load signal via line 27 to counters 81 coincident with the last bit of the last block. In response thereto the counters 81 load therein the previously described hexature error correction value HA via lines 28 from the hexature memory 42 of FIG. 8, as shown in FIG. 4I.

Window generator 31 preferably comprises two serially connected one-shots 125, 126. The first one shot 125 receives the previously described tachmometer pulses on line 30 and it delays them to coincide with the first data block, while the second one shot 126 determines the width of the output pulse on line 32 as shown in FIG. 4B. As previously described, during normal operation both the primary and secondary sync pulses are received on output lines 15, 17 from the correlator 14, respectively, during their respective windows provided on lines 83, 84. OR gates 91, 92 are utilized to apply a pulse on line 15a to multiplexer 85 when the primary sync on line 15 is received during either window on line 83a from PROM 82 or on line 32 from window generator 31 respectively. Depending on the previously described status select control signal applied thereto on line 55 from block counter 54, the multiplexer 85 activates the previously described load line 27 while the fixed word of 360 bits is being loaded into counters 81 via lines 28 from word storage 34 as previously described with reference to FIGS. 3 and 4. Thus every time when a primary sync occurs on line 15 the counters 81 are preset via lines 28 to a value 360 as shown in FIGS. 4A to 4C and 4I. It is noted that flip-flop 95 in FIG. 9 is utilized to latch the aforesaid primary and secondary sync windows.

It follows from the foregoing description that in case the primary sync does not occur during either window on line 32 or 83a, respectively, the control signal on line 27 will not activate loading of the fixed word into counters 81. Instead, the previously loaded error correction value HA will have started these counters 81 while resetting and synchronization of these counters is provided as follows.

When the secondary sync on line 17 is received during its window on line 84a by an OR-gate 93, it applies a control signal via line 96 to a D flip-flop 97 which in turn applies a reset pulse via reset line 103 to reset the counters 81 to zero at the beginning of each block. D flip-flop 97, preferably type 100131, is utilized together with a NOR-gate 98 to shorten the duration of the reset pulse as well known in the art.

Alternatively, the counters 81 are reset by their own terminal count G on line 25 applied via one input of NOR-gate 101 and line 102 to D flip-flop 97. The other input of NOR-gate 101 receives the previously described last block control pulse on line 55, shown in FIG. 4F which in conjunction with multiplexer 85 diverts the terminal count G to load counters 81 as previously described.

It is seen from the foregoing description that in case the secondary sync on line 17 is not received within its window generated on line 84a, and a reset pulse on line 103 is therefore not provided in response thereto, the counters 81 will reset at their own terminal count G on line 25 and consequently synchronization will be maintained.

The above-described operation of the circuit of FIG. 9 is further exemplified by a flow chart shown in FIG. 14 which conceptually describes that operation.

FIG. 10 shows a detailed diagram of the status comparator 43 and fixed word storage 45 of FIG. 3. The status comparator 43 comprises a magnitude comparator 105, preferably type 100166 and D flip-flops 106 and 107, preferably type 100131. The comparator 105 receives at one input a continuously changing count M on lines 23 from the block format counter 21 and at another input a fixed word N via lines 44 from fixed word storage 45. The word storage 45 of FIG. 10 is preferably implemented by subminiature dip switches 47, whose contacts are set to contain a binary count N=360 at which the primary sync on line 15a occurs ideally, that is, when no hexature error is encountered. The comparator 105 continuously compares bit-by-bit its respective input signals M, N and it provides an output signal on lines 111 therefrom indicating the current status of the comparison as described previously with reference to FIG. 3 and Table 1. The signal on lines 111 is applied to D flip-flop 107 and it is clocked therein in response to the previously described primary sync on line 15a provided by the control logic circuit 24. The output signal from flip-flop 107 corresponds to the previously described. output signal on line 46 from status comparator 43 and it is applied to the status accumulator 41 of FIG. 3 as described below.

When the flip-flop 106 receives the write enable pulse on line 57 coincidentally with the beginning of the last block of head scan, that pulse is reclocked by a clock signal on line 113 which in turn is derived from the count on lines 23 from counter 21 at one fourth of the clock rate on line 104. Thus the output signal on line 112 from flip-flop 106 corresponds to the signal on line 57 delayed by the signal on line 113 and it is utilized to clear the output of the comparator 105 after the occurrence of each write enable pulse on line 57.

FIG. 11A shows a detailed circuit diagram of the tip counter 37 previously described with reference to the block diagram of FIG. 3. The tip counter 37, preferably implemented by a 4-bit counter 114 type 10136, is connected as a modulo 6 counter which continuously counts from zero to five and resets synchronously to zero via AND gate 116 as well known in the art.

In FIG. 11B a detailed circuit diagram of the block counter 54 and of the write enable pulse generator 56 is shown, respectively. The block counter 54, preferably implemented by two 4-bit counters 115, type 100136 is connected as a modulo 91 counter which counts continuously from zero to 90, and resets synchronously to zero by its terminal count. The counter 115 also resets asynchronously by the previously described pulse on line 15a, that is in response to the primary sync pulse of FIG. 4C which has been resynchronized by the control logic circuit 24 as described before. The write enable pulse generator 56 comprises a D flip-flop 118, preferably type 100131 and a NOR-gate 124 and an inverter 121. The pulse generator 56 receives the modulo 91 terminal count indicating the last block pulse on line 55 from counter 115 and it provides both a write enable pulse $\overline{WE}$ and an inverted write enable pulse WE on lines 57, respectively, for further use by devices 41, 42 and 43 as described previously.

While the invention has been shown and described with particular reference to the preferred embodiment thereof, it will be understood that variations and modifications in form and details may be made therein without departing from the spirit and scope of the invention as defined in the appended claims.

What is claimed is:

1. A system for providing synchronization of a digital signal recorded on and subsequently reproduced from a magnetic medium having recording tracks of a known length, wherein a synchronization signal is recorded at the beginning of each track and wherein a primary sync signal is provided in response to each reproduced synchronization signal, comprising:

a first means coupled to count the number of data bits corresponding to the length of each said track in synchronization with said reproduced digital signal;

a second means coupled to synchronize said counting means with said primary sync signal;

a third means coupled to detect a timing error between consecutive tracks as a difference signal between a normal occurrence of said primary sync signal with reference to the end of an immediately preceding track and an actual occurrence of said primary sync signal and to responsively provide, updata and store a correction signal; and a fourth means coupled to apply said stored correction signal to offset said counting means in the absence of said primary sync signal to reduce said timing error.

2. The system of claim 1 wherein each said track has a known number of data blocks of a known length and wherein a secondary sync signal is further provided in response to each block of reproduced data and where:

said first means is coupled to count the number of data bits corresponding to the length of each said data block; and said second means is further coupled to synchronize said counting means with said secondary sync signal.

3. The system of claim 1 further comprising:

a fifth means coupled to accumulate the number of occurrences of said difference signal provided by said third means in the same direction and to provide said correction signal when a predetermined number of occurrences in one direction is obtained.

4. A system for providing synchronization of digital signals recorded on and subsequently reproduced from a magnetic medium, utilizing a magnetic transducing device having at least two equidistantly spaced recording/reproducing transducers arranged on a rotating drum, said recorded signal having a synchronization signal recorded at the beginning of each data track, said system receiving said reproduced signal and providing a primary sync signal in response to each reproduced synchronization signal, comprising:

a data format counting means coupled to receive a known fixed count in response to each said primary sync signal, and to provide a count synchronous with said reproduced data; said known fixed count corresponding to a normal occurrence of said primary sync signal with reference to the end of an immediately preceding track;

a comparator means having a first input coupled to receive said count from said data format counting means, a second input coupled to receive said known fixed count and having a control input coupled to receive said primary sync signal, said comparator means having an output coupled to provide a difference signal indicating a timing error between said respective input signals thereof at the time of receiving said primary sync signal;

a memory means coupled to updata and store a variable preset count of said counter means, said preset count being updated in response to said difference signal to reduce said timing error with reference to said reproduced signal; and a control means coupled to control synchronously application of said variable preset count from said memory means to said data format counting means at the beginning of each data track in the absence of said primary sync signal to reduce said timing error.

5. The system of claim 4 wherein each said track has a known number of data blocks of a known length and wherein a secondary sync signal is further provided in response to each block of reproduced data and where:

said data format counting means is further coupled to count the number of data bits corresponding to the length of each said data block and said control means is further coupled to synchronize said data format counting means with said secondary sync signal.

6. The system of claim 4 further comprising an accumulating means having an input coupled to receive said output signal of said comparator means and to accumulate the number of occurrences of said timing error in the same direction and to apply a control signal to said memory means to update said stored variable preset count when a predetermined number of said occurrences in one direction is obtained.

7. The system of claim 4 wherein:

said memory means further comprises an incrementing and a decrementing stage, respectively;

said difference signal provided by said comparator means indicates a direction of said timing error and wherein said accumulating means is coupled to provide a first control signal and to apply it to said incrementing stage when said predetermined number of occurrences of said timing error in one direction is obtained and to provide a second control signal and to apply it to said decrementing stage in response to said predetermined number of occurrences of said timing error in a second direction, opposite to said first direction.

8. The system of claim 5 wherein said synchronization signal is recorded within a first block of data on each track and wherein said control means is further coupled to provide a third control signal synchronously with the begining of each said first block to control application of said variable preset count from said memory means to said format counting means and to provide a fourth control signal to control application of said known fixed count to said data format counting means synchronously with receiving said primary sync signal and following application of said third control signal thereto.

9. A system for providing synchronization of digital signals recorded on and subsequently reproduced from parallel tracks of a magnetic medium, utilizing a magnetic transducing device having at least two equidistantly spaced recording/reproducing transducers arranged on a rotating drum, each track having a known number of data blocks of a known length, a synchronization signal being recorded within a first block of each data track, said system receiving said reproduced signal and providing a primary sync signal in response to each synchronization signal and providing a secondary sync signal in response to each data block, comprising:

a block format counting means coupled to receive a known fixed count in response to each said primary sync signal and to provide a count synchronous with said reproduced data and corresponding to the length of each said data block, said known fixed count corresponding to a normal occurrence of said primary sync signal with reference to the end of an immediately preceding track;

a comparator means having a first input coupled to receive said count from said data format counting means, a second input coupled to receive said known fixed count and having a control input coupled to receive said primary sync signal, said comparator means having an output coupled to provide a difference signal indicating direction of timing error between said respective input signals thereof at the time of receiving said primary sync signal;

an accumulating means having an input coupled to receive said output signal of said comparator means and to accumulate the number of occurrences of said timing error in the same direction, said accumulating means is coupled to provide a first control signal when a predetermined number of said occurrences in one direction is obtained and to provide a second control signal when a predetermined number of occurrences is obtained in a second direction, opposite to said first direction;

a memory means coupled to store a variable preset count of said counter means to increment said stored count in response to said first control signal, and to decrement said stored count in response to said second control signal; and a control means coupled to synchronize said block format counting means with said secondary sync signal, to provide a third control signal synchronously with the beginning of each said first block to control application of said variable preset count from said memory means to said format counting means and to provide a fourth control signal to control application of said known fixed count to said data format counting means synchronously with receiving said primary sync signal and following application of said third control signal thereto.

10. A method of providing synchronization of a digital signal recorded on and subsequently reproduced from a magnetic medium having recording tracks of a known length, wherein a synchronization signal is recorded at the beginning of each track and wherein a primary sync signal is provided in response to each reproduced synchronization signal, comprising the steps of:

counting the number of data bits corresponding to the length of each said reproduced track synchronously with said reproduced digital signal, said counting being synchronized in reponse to respective occurrences of said primary sync signal;

detecting a timing error between consecutive tracks as a difference between a normal occurrence of said primary sync signal with reference to the end of an immediately preceding track and an actual occurrence of said primary sync signal and responsively providing updating and storing a correction signal, respectively; and applying said stored correction signal to offset said counting to reduce said timing error in the absence of a primary sync signal.

11. The method of claim 10 wherein each said track has a known number of data blocks of a known length, wherein a secondary sync signal is provided in response to each block of reproduced data and wherein said counting step comprises counting the number of data bits corresponding to the length of each said data block synchronously with an occurrence of said secondary sync signal.

12. The method of claim 10 wherein said detecting step comprises providing a signal indicating a direction of said timing error and wherein said method further comprises the steps of accumulating the number of occurrences of said timing error in the same direction and providing said correction signal when a predetermined number of said occurrences in one direction is obtained.

13. The method of claim 12 further comprising:
providing a first control signal when said predetermined number of occurrences of said timing error in a first direction is obtained;
incrementing a value of said correction signal in response to said first control signal;
providing a second control signal when said predetermined number of occurrences of said timing error in a second direction, opposite said first direction is obtained; and
decrementing a value of said correction signal in response to said second control signal.

14. The method of claim 11 wherein said synhronization signal is recorded within a first block of data on each track further comprising:
providing a third control signal synchronously with the beginning of each first block;
applying said updated stored correction signal to offset said counting of the data bits in response to said third control signal;
providing a fourth control signal synchronously with receiving said primary sync signal and following said third control signal; and
synchronizing said counting in response to said fourth control signal.

15. A method of providing synchronization of digital signals recorded on and subsequently reproduced from parallel tracks of a magnetic medium, utilizing a magnetic transducing device having at least two equidistantly spaced recording/reproducing transducers arranged on a rotating drum, each track having a known number of data blocks of a known length, a synchronization signal being recorded within a first block of each data track, wherein a primary sync signal is provided in response to each reproduced synchronization signal and a secondary sync signal is provided in response to each data block, comprising:
counting the number of data bits corresponding to the length of each said data block synchronously with respective occurrences of said primary and secondary sync signals;
detecting direction of a timing error between consecutive tracks as a difference between a normal occurrence of said primary sync signal with reference to the end of an immediately preceding track and an actual occurrence of said primary sync signal and responsively providing a timing error direction signal;
accumulating the number of occurrences of said timing error direction signal in the same direction and providing a first control signal when a predetermined number of said occurrences in a first direction is obtained and providing a second control signal when a predetermined number of said occurrences is obtained in a second direction, opposite to said first direction;
providing and storing a correction signal to reduce said timing error in response to said timing error direction signal;
updating said stored correction signal by incrementing or decrementing the same in response to said first or second control signal, respectively; and
applying said updated correction signal to offset said counting synchronously with the beginning of the first data block of each track prior to said occurrence of the primary sync signal.

* * * * *

UNITED STATES PATENT AND TRADEMARK OFFICE
CERTIFICATE OF CORRECTION

PATENT NO. : 4,525,754

DATED : June 25, 1985

INVENTOR(S) : Kirk H. Handley

It is certified that error appears in the above-identified patent and that said Letters Patent is hereby corrected as shown below:

Column 5, line 57, "receiving" should read --receiving--;

Column 7, line 62, after "is", delete --now--;

Column 9, line 53, change "M>N" to --M<N--;

Column 13, line 27, after "described" delete --.--(period sign);

Column 14, line 25, change "updata" to --update--;

Column 15, line 4, change "updata" to --update--.

Signed and Sealed this

Twenty-second Day of October 1985

[SEAL]

Attest:

DONALD J. QUIGG

*Attesting Officer*

Commissioner of Patents and Trademarks—Designate